Patented July 17, 1928.

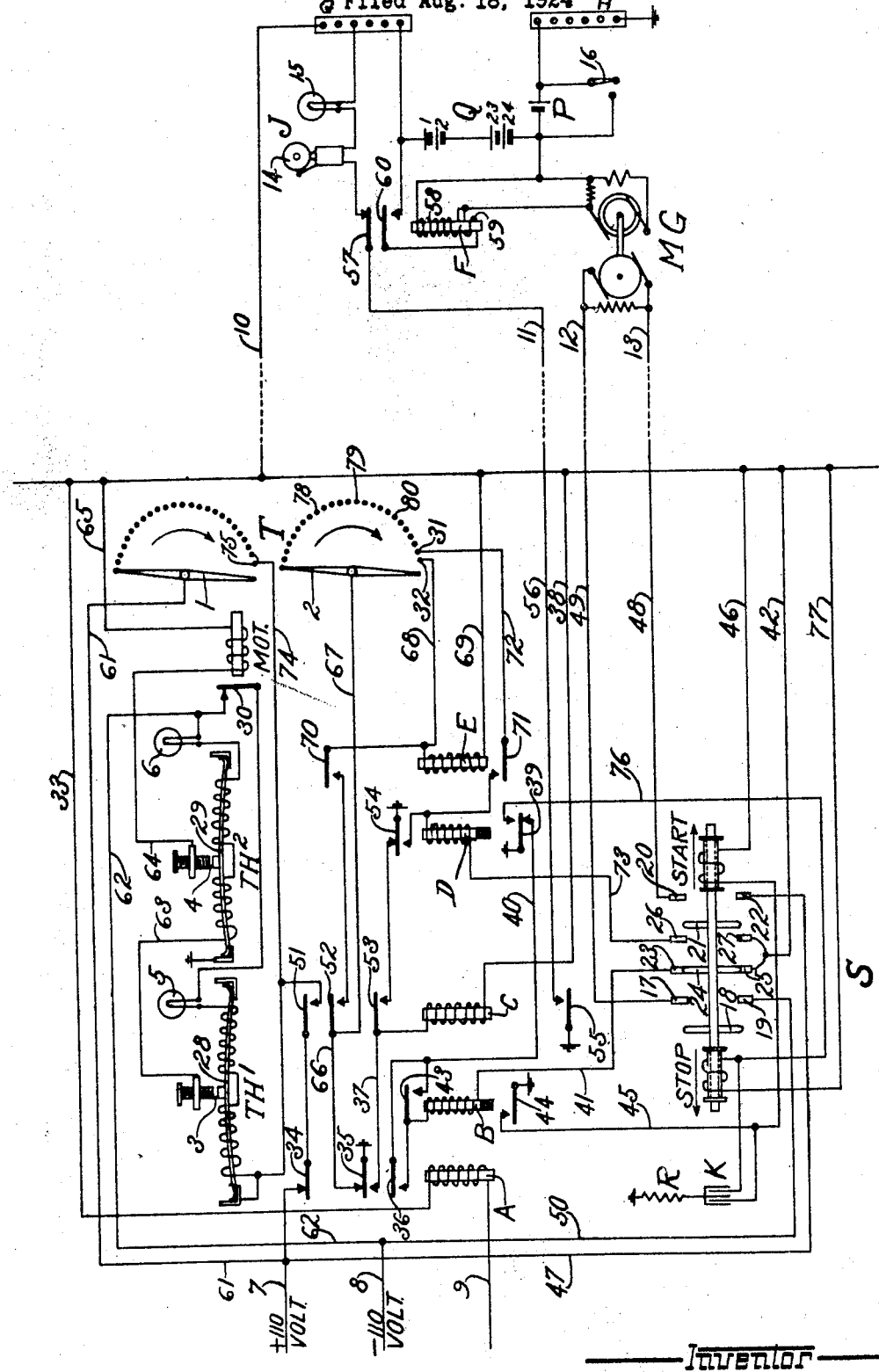

1,677,644

UNITED STATES PATENT OFFICE.

CLARENCE E. LOMAX, OF CHICAGO, ILLINOIS, ASSIGNOR, BY MESNE ASSIGNMENTS, TO AUTOMATIC ELECTRIC INC., OF CHICAGO, ILLINOIS, A CORPORATION OF DELAWARE.

AUTOMATIC BATTERY-CHARGING SYSTEM.

Application filed August 18, 1924. Serial No. 732,639.

The present invention relates in general to automatic battery charging systems, and the object of the invention, broadly stated, is to produce a new and improved system of this character operating on novel principles and possessing numerous advantages not found in prior systems.

The principal object of the invention involves provisions of means in a battery charging system which permit the use of a very small battery. To be more specific, it is desired to use the battery under normal conditions only for starting the machine and for damping out audio-frequency currents emanating from the generator afterwards. The current, however, required by the equipment drawing current from the battery, which in the example illustrating my invention is assumed to be a telephone exchange, is supplied entirely by the generator, and the battery is being charged whenever the generator is running to keep it at its normal capacity.

In attaining the foregoing object, I use a battery floating scheme which differs from that usually employed in telephone exchanges in that I do not have a fixed floating or charging current, but a fixed open circuit generator voltage which is preferably two volts higher than the maximum permissible voltage on the switch-board.

The reason for having a fixed voltage is to prevent the switch-board voltage becoming excessively high, during light traffic, without using a special voltage regulating equipment. One counter-cell with a back-pressure of two volts is always in the discharge circuit, therefore, if the traffic is light and the battery becomes charged to a voltage equal to the generator voltage, the switch-board voltage, through the counter-cell, will be no higher than the maximum allowable.

If, for example, a range is allowed from 46 to 52 volts on the switch-board, with the counter-cell this means a range of 48 to 54 volts in the battery. If it is determined that the maximum load is 5 amperes, a machine will be used with an open circuit voltage of 54 volts, capable of delivering 5 amperes to the exchange when connected across a 48 volt battery, without drawing any current from the battery. This automatically keeps the switch-board voltage between 46 and 52 volts and eliminates special voltage regulating means.

The generator voltage two volts higher than the maximum permissible voltage on the switch-board, and a counter-cell to reduce the voltage in the discharge circuit, have been adopted in order to keep the battery fully charged and to provide for a reserve of full 24 cells in case of machine failure. The life of the battery is thereby increased and the necessity of frequent overcharging eliminated.

To explain this further, if the generator voltage would be lowered by two volts, and the counter-cell omitted, the voltage in the battery would be lower than is desirable, as it is known that the life of a battery is increased if the voltage of a cell is kept at about 2.1 volts and not lower than two volts.

The same effect could of course be obtained by dropping the generator voltage two volts, omitting the counter-cell, and removing also one active cell. But if this were done, the failure of the machine or the commercial current source would leave only 23 cells as a reserve. When 24 cells are used, the counter-cell can be shunted in case of emergency and full 24 cells are available.

The generator should preferably be a compound wound machine. A shunt wound generator could of course be used also, but the voltage drop which takes place by using this type makes it undesirable. The generator should be under-compounded enough to give a drop of 3 volts between full charge and no charge in order to prevent excessive charging when connected up with an almost discharged battery.

Another object relates to a signal arrangement which operates in case of machine failure to call the attention of the office attendant. The counter-cell which is normally in the discharge circuit will be shunted in this case through a manually operable switch, and the switch-board load carried by the battery.

A further object of my invention resides in means to produce a delayed charge cut-off through the medium of an automatic timing device for controlling the motor circuit of the motor-generator. The motor will be stopped only if a certain predetermined time has elapsed during which no current is required by the switchboards. This period of time is determined by the peculiar local conditions and may range from a few minutes to one hour.

It will be advisable to enter into a short discussion concerning this last mentioned object, before proceeding with the description.

At any place where intermittent current is required, as for example in a telephone exchange, it is desirable to disconnect the battery charging means during the periods of silence. Automatic battery charging systems have been devised for this purpose, which start the motor of the motor generator, or other equipment for charging the battery, in response to the initiation of a call, or, more particularly, responsive to certain relay operations following the removal of the receiver by the calling subscriber, and disconnect them again after the call is finished provided no other call is present. Thus, if depending solely on the presence of a call, the machine is bound to start and to stop many times during the day, which is not only a burden on the machine, but consumes a considerable amount of current due to the frequent starts.

Periods of silence occur, as every one experienced in the art knows, quite frequently in a small telephone exchange. However, their duration varies greatly and may range from one second during the peak hour up to one half hour and more during noon time. In consideration of these conditions, it is advisable to provide for automatic battery charging means capable of discriminating between a desirable and non-desirable stop of the motor-generator, in other words means that actuate the charge cut-off only after a certain predetermined time has elapsed during which no call was made.

It is obvious that the provision of a delayed charge cut-off is especially advantageous in connection with a battery charging system of the character herein explained, which uses only a very small battery. The current drawn from the battery in starting the machine is being replaced in periods of silence which are too short to make a disconnection of the battery charging means economical.

In view of the foregoing, which shows clearly that my invention is concerned with an automatic battery charging system and delayed charge cut-off, it is thought to be superfluous to show the switches involved in the extension of a call, as their construction and operation is well known in the art; also in consideration of the fact that my invention is not intended to be used in connection with a particular system, or to be limited in its application, but may be used at any place where intermittent current is required, I have not shown any switches but solely the arrangement necessary to attain the desired result.

The stated objects and other features of the invention will be described and explained fully hereinafter, reference being had to the accompanying drawing forming a part of this specification.

The single figure of drawings diagrammatically shows various pieces of well known equipment linked together with circuits which, with the description that follows, will enable the invention to be clearly understood.

Referring now to the drawing, I have shown by means of conventional diagrams the manner of carrying out my invention.

At T I have shown a timing switch, which is a step by step switch of the rotary type and comprises the wipers 1 and 2; two thermostats $TH^1$ and $TH^2$ are provided for causing the stepping operation of the timing switch T through the medium of its motor magnet MOT. The thermostats are of well known construction and can be adjusted to operate to close the contacts 3 and 4 according to a certain interval of time. Three relays indicated by the reference letters A, B and C, serve to start the operation of the solenoid power switch S through the energization of its start relay, and also prepare for the subsequent action of the thermostats and of the timing switch. I further show two relays D and E which are adapted to be actuated responsive to the operation of the timing switch T to energize the stop relay of the solenoid switch S. The lamps 5 and 6 have been provided for the protection of the thermostats; resistance R and condenser K serve for spark quenching.

Referring to the solenoid power switch S in particular, this is a circuit closing device including a solenoid having a winding at each end, adapted to draw the bar forward and back again in directions indicated by the arrows, to connect and disconnect commercial current to and from the motor of the motor-generator MG, and also to prepare the circuits of its own two windings. That is, in its normal position, as shown in the drawing, the circuit of its right hand solenoid winding is prepared which is adapted, when energized, to pull the switch into its alternate position to connect the motor circuit, and prepare a circuit for its left hand solenoid winding which is adapted to operate in a reverse manner.

To the left hand side of the drawing I have shown three leads 7, 8 and 9, terminating in my arrangement. Leads 7 and 8 are carrying commercial current of a suitable voltage for the operation of the thermostats $TH^1$ and $TH^2$, and also for the motor of the motor generator MG, which is shown at the right hand side of the drawing together with a circuit breaker F, alarm signal J comprising a bell 14 and a lamp 15, battery Q, a counter-cell P, a manual switch 16 for cutting the counter-cell in and out, and two bus bars G and H, the latter of which is grounded. The commercial current source is assumed to be one that delivers direct current of 110 volts, and, accordingly I have shown a shunt-wound motor. It is, however, to be understood that the current source may also be of a higher voltage, or of alternating current, and that the motor will be determined by the local conditions, i. e., by the current which is available. It is, likewise, immaterial, for the purpose of explaining the invention, whether a shunt- or a compound-wound generator is employed. However, a compound wound generator is preferably used for reasons hereinbefore set forth, and I have, therefore, shown the generator to be a compound machine.

Lead 10 provides for the distribution of battery from the bus bar G to the various points where battery is required. It is to be understood that ground is distributed similarly from the grounded bus-bar H and that I have shown several grounds only for convenience. Leads 12 and 13 provide for the connection of the motor to the contacts 17 and 20 of the solenoid power switch, and lead 11 is for connecting the alarm signal J.

I shall now explain the operation of my invention in detail. Assume the apparatus to be in the position shown with the charging circuit opened, that is, no call is present and the motor generator is at rest. Upon a subscriber removing his receiver to extend a call, certain relays will operate and ground will be connected to lead 9. A circuit will be completed for relay A which may be traced from ground at a selector or a connector, lead 9 which is common for all apparatus in the exchange, winding relay A, lead 33 to bus-bar G, and battery. Contact 34 opens the energizing circuit of the thermostats $TH^1$ and $TH^2$; contact 35 changes over into its alternate position to energize relay C from ground on contact 35, lead 37, relay C, leads 38 and 10 to battery; contact 36 closes to complete the circuit for relay B from ground, contact 39 of relay D, lead 40, contact 36, relay B, lead 41, contacts 23, 24 and 25 of the solenoid switch S, leads 42 and 10 to battery. Relay B energizes and locks itself to ground at contact 39 over its own contact 43, being now independent of contact 36 of relay A, while contact 44 completes the circuit for the start magnet of the solenoid switch S which can be traced from ground at contact 44, lead 45, winding of the start relay, leads 46 and 10 to battery. The solenoid switch S draws the bar in a direction indicated by the arrow over the start magnet and the contacts 18, 24, and 21 assume their alternate positions connecting commercial current to the motor of the motor generator MG. This circuit may be followed from conductor 7, which is assumed to be the positive pole of a commercial current source, lead 47, contacts 22, 21 and 20 of the solenoid switch, leads 48 and 13 to the motor and back over leads 12, 49, contacts 17, 18, 19, lead 50, conductor 8, to the negative pole. Contact 24 mounted on the bar of the solenoid switch S has changed over from the contacts 23 and 25, to assume its alternate position on contacts 26 and 27, thereby preparing a circuit for relay D, and disconnecting relay B which deenergizes. Relay B as indicated is a slow to release relay to insure an impulse of sufficient duration for fully energizing the start magnet. Relay C, as will be remembered, has been energized, and, with its contact 51, has prepared the circuit for the thermostat $TH^1$; contact 52 prepares a holding path for relay E, contact 53 a locking circuit for relay C which can be followed from ground at contact 54 of relay D, contact 53, relay C, leads 38 and 10 to battery. Contact 55 is closed to supply ground for the alarm signal arrangement J over leads 56 and 11, contact 57 of relay F, bell 14, signal lamp 15 to battery. Circuit breaker F will energize over its winding 58 in response to the proper operation of the generator and opens contact 57 so that no alarm is given. In case of machine failure, however, F remains inert, and the signal arrangement J operates. Switch 16 will then be closed manually, shunting the counter-cell P, and the battery Q, comprising twenty-four cells of which only the first and last two cells are shown, will carry the switchboard load until the trouble is removed. Ordinarily, the counter-cell remains in the circuit, producing an effect as has been mentioned in a previous paragraph. Circuit breaker F also closes contact 60, completing the battery charging circuit over its own series winding 59.

No change takes place as long as a call is present. Relay A will be maintained energized, supplied with ground over conductor 9, from a switch used in the extension of a call, or if my invention is adopted for other service than in a telephone exchange, from a relay or similar apparatus indicating that current is required.

In order to explain the operation of the timing switch and the subsequent disconnection of commercial current from the charging equipment, I shall assume next that a period of silence occurs, that is, a period during which no current is required. I will further assume that this period of silence is sufficiently long that it exceeds the time provided for the operation of the timing switch, so that ultimately the disconnection of the commercial current takes place through the operation of the stop relay of the solenoid switch S.

Ground will be removed from conductor 9 and relay A deenergizes. Contacts 34, 35 and 36 assume the position in which they are shown in the drawing. Relay C, as will be remembered, is maintained energized over its own contact 53 to ground on contact 54 of relay D. Wiper 1 of the timing switch is, as can readily be seen, permanently connected to positive 110 volt current from conductor 7 over lead 61, while ground is connected to wiper 2 through contact 35 of relay A. A circuit will now be completed over thermostat $TH^1$, which can be traced from the positive pole of the commercial current source, conductor 7, contacts 34 of relay A and 51 of relay C, winding of thermostat $TH^1$, lamp 5, contact 30 of stepping magnet MOT, lead 62, conductor 8 to the negative pole. After an interval spring 28 of thermostat $TH^1$ will be expanded enough to close contact 3 thereby causing the operation of the thermostat $TH^2$ over lead 63, lamp 6, lead 62, conductor 8 to negative pole of the commercial current source. Spring 29 will expand now responding to the heat production of thermostat $TH^2$ and eventually complete a circuit for the motor magnet MOT of the timing switch T. This circuit can be followed from ground on thermostat spring 29, contact 4, lead 64, winding of motor magnet MOT, lead 65 and 10 to negative bus bar G and to battery. Motor magnet MOT energizes and contact 30 will be opened, thereby disconnecting the circuit for thermostat $TH^1$. The temperature of $TH^1$ will be reduced now and spring 28 separated from contact 3, which causes an interruption of the circuit for thermostat $TH^2$. After the temperature of $TH^2$ has been reduced to a certain point, spring 29 contracts and opens the circuit for the motor magnet MOT, which thereupon deenergizes and advances the wipers one step. Following the deenergization of MOT, contact 30 assumes the position in which it is shown in the drawing, closing thereby the circuit for thermostat $TH^1$, and a new cycle results. Thus, the timing switch will operate step by step, moving its wipers 1 and 2 over the bank contacts at a rate of about one step per minute, which is assumed to be the maximum time to which the thermostats can be adjusted.

When contact 32 is reached by wiper 2, a circuit will be completed for relay E which may be traced from ground at contact 35 of relay A, leads 66 and 67, wiper 2, contact 32, lead 68, winding of relay E, leads 69 and 10 to negative bus bar G and battery. Relay E energizes and completes a holding circuit for its own winding over contact 70 contact 52 of relay C, to ground at contact 35 of relay A, and prepares a circuit for relay D by closing its contact 71, while the timing switch is continuing its operation. When wiper 2, in the course of its revolution, reaches contact 31, relay D will operate. This circuit can be followed from ground on contact 35 of relay A, leads 66 and 67, wiper 2, contact 31, lead 72, contact 71 of relay E, winding of relay D, lead 73, the contacts 26 24 and 27 of the solenoid switch S, leads 45 and 10 to negative bus bar G and to battery. Upon the energization of relay D, contact 54 will assume its alternate position and open thereby the holding circuit for relay C, but furnishing a locking circuit for relay D. Relay C deenergizes, opening the path for the operation of the thermostats through contact 51, and deenergizing also relay E through the interruption of its holding circuit which has been effective over its contact 52. The operation of the timing switch will, however, not be interrupted now because of wiper 1 which is permanently connected to the positive pole of the commercial current source over lead 61 and conductor 7, and furnishes current for the thermostats over lead 74, causing the thermostats to operate until the timing switch has assumed its normal position in which it is shown in the drawing, that is, until wiper 1 has left contact 75.

The energization of relay D causes also contact 39 to change over into its alternate position, completing thereby a circuit for the stop magnet of the solenoid switch S which can be traced from ground on contact 39, lead 76, winding of the stop magnet, leads 77 and 10 to negative bus bar G and to battery. The stop magnet energizes and draws the bar carrying the contacts 18, 24, and 21 back into normal position, thereby disconnecting commercial current from the motor generator MG. When contact 24 leaves contacts 26 and 27 relay D will deenergize. Relay D is, as can be seen, a slow to release relay to insure an impulse of sufficient length for the stop magnet of the solenoid switch. After relay D has returned to its normal position, the equipment is ready to serve again for the connection of the charging circuit and subsequent delayed disconnection caused through a period during which no current is required.

The operation of the timing switch would consume in the foregoing example where the maximum time has been assumed, approximately fifty minutes. It will, however, be understood that this time can be reduced by properly adjusting the thermostats or by changing the wiring for the bank contacts which are under the influence of wiper 2. If lead wire 72 is, for example, connected to contact 78 instead of to contact 31, the total time will be reduced by fifteen minutes; if connected to contact 79 the reduction will be ten minutes, and if the connection is made to contact 80, the time for the operation of the stop magnet will be lowered by five minutes. This will be readily understood from an examination of the drawing, if it is remembered that the circuit for the stop magnet is closed by relay D, and that the operation of this relay is controlled by wiper 2. Thus the time may be adjusted either mechanically through the thermostats, or by changing the location of the lead wire 72. The following considerations shall, however, cover only conditions in which it is assumed that the lead wire 72 is connected to contact 31.

If current is required again while the timing switch is in operation, that is, if my invention is used in a telephone exchange, if a subscriber removes the receiver to extend a call he thus interrupts the period of silence. In considering this case it should be observed that I have not provided for a normal position of the timing switch to which it is bound to return if stopped in its operation. The timing switch is merely stopped in the position to which it has been advanced and will, in response to the next period of silence, commence from this position. Accordingly, the total time for operation of the timing switch will be shortened or prolonged in the next period of silence, depending on how far the timing switch has been advanced previously, or, more particularly, depending on the position in which the operation of the timing switch has been interrupted.

There are two phases to be considered. The one covers the period commencing with the first step of the timing switch, that is, when the wipers leave the position in which they are shown in the drawing, and ending with the operation of relay E when wiper 2 reaches contact 32. The other period covers the remaining time until the energization of relay D in response to ground supplied by wiper 2 over contact 31.

Assume that the timing switch is operating, and has advanced its wipers 1 and 2 by ten steps when a subscriber removes his receiver. The timing switch is still within the range of what I have termed the first phase of its operation. Ground will be connected to conductor 9, and relay A will operate, opening contact 34 and interrupting thereby the circuit of the thermostats. The switching over of contact 35 will have no influence whatever as relay C has been energized previously and locked itself over its contact 53 to ground at contact 54 of relay D. The closing of contact 36 will likewise be without any immediate effect, because relay B is prevented from energizing by contact arm 24 of the solenoid switch which is in its alternate position. The energization of relay A will therefore result in stopping the timing switch at that point to which it was advanced, and which is assumed to be the tenth contact. The next silent period will cause a de-energization of relay A and a subsequent operation of the timing switch in a manner as already described. The total time will therefore be reduced by a period which is equal to that required to step the timing switch into the position from which it has resumed its operation in response to a new period of silence.

If the timing switch has already reached contact 32 and operated relay E, it is within the range of its second phase. If relay A energizes now in response to a subscriber initiating a call, the operation is as follows: The circuit of the thermostats will be interrupted by contact 34 which is opened by the energization of relay A. The changing over of contact 35 will result in a deenergization of relay E, which has locked itself over its own contact 70, contact 52 of relay C, to ground at contact 35. The subsequently following silent period will cause the operation of the timing switch as usual, but the total time will be longer by the period which is required to move the timing switch wipers out of the second phase to the position in which they are shown in the drawing.

It will be seen from the foregoing description that I have designed a useful arrangement which can easily be adopted for battery charging in connection with any kind of service where intermittent current is required, being simple in its construction and convenient in operation.

What I consider to be new and desire to have protected by Letters Patent will be pointed out in the appended claims.

What is claimed is:

1. In combination, a storage battery provided for an equipment which intermittently draws current from said battery, there being periods of times of variable duration during which no current is required, charging means for said battery, a switching device for automatically connecting said charging means when current is required and for causing its disconnection during periods in which no current is required, and means comprising a plurality of electrically operated apparatuses including a stepping device for automatically delaying the operation of said switching device for a predetermined period of time.

2. In combination, a storage battery provided for an equipment which intermittently draws current from said battery, there being silent periods of times during which no current is required, charging means for said battery, a switching device for connecting said charging means without delay whenever current is used irrespective of the condition of said battery and for disconnecting the charging means after the lapse of a certain period of time after the demand for current ceases, and an electrically operable step by step switch for controlling the operation of said switching device having provisions to variably adjust the time period according to the requirements.

3. In combination, a storage battery provided for an equipment which intermittently draws current from said battery, there being silent periods of time during which no current is required, charging means for said battery, a switching device for connecting said charging means without delay when current is required and for disconnecting the charging means after the lapse of a certain period of time after the demand for current ceases, electrically operable apparatus for the control of said switching device having provisions to variably adjust the time period according to the requirements, and provisions to stop the operation of said controlling means if started by a silent period, when said silent period is interrupted by a demand for current.

4. The combination, with a battery and generator adapted to operate in parallel, the generator being normally at rest, means for automatically starting the operation of said generator when current is used irrespective of the condition of the battery and of the quantity of current being used, means for automatically stopping the operation of the generator a variable predetermined time after the use of current has ceased, and means for temporarily disabling said stopping means before the expiration of a predetermined time interval in a position dependent on the portion of the time interval which has expired.

5. The combination, with a battery and generator adapted to operate in parallel, the generator being normally at rest, of means for automatically starting the operation of said generator when current is required, an automatic step by step switch, means including a thermostat for periodically advancing said switch as soon as the need for current ceases, and means operated by said switch when it has advanced a predetermined amount for stopping the operation of said generator.

6. The combination, with a battery and generator adapted to operate in parallel, the generator being normally at rest, of means for automatically starting the operation of said generator when current is required, an automatic step by step switch, means for advancing said switch at any desired rate, said advancing means operating responsive to the cessation of current flow, and means operated by said switch when it has advanced a predetermined amount for stopping the operation of said generator.

7. A system for supplying electrical current comprising a constant voltage generator of sufficient capacity to supply the maximum current supplied, a relatively small storage battery connected in parallel with said generator when the same is running, means for automatically starting the operation of said generator when current is required irrespective of the condition of the battery, said means operated electrically by current supplied from said battery, means for continuing the operation of said generator for a certain time interval after the need for current has ceased, and means including a step by step timing device for stopping the operation of the generator when the interval has expired.

8. A system for supplying current comprising supply bus bars, a battery normally connected to said bus bars, a generator normally disconnected from said bus bars, a relay connected directly across the terminals of said battery responsive to the placing of a load on said system for automatically starting the operation of said generator irrespective of the condition of the battery, means for connecting the generator across said bus bars to carry the load, means responsive to the removal of the load for stopping the operation of said generator, means for delaying the operation of said stopping means set in motion to provide for charging the battery for a certain period after the load is removed, means for stopping said delaying means at an intermediate position in certain instances before the certain period has expired, and means for adjusting the delaying means to increase or diminish the battery charging interval as desired.

9. In combination with a battery, a charging device including a relay connected directly across the terminals of the battery responsive to an initial withdrawal of current to start the charging operation and means responsive to the cessation of current withdrawal to cause the charging operation to continue for a predetermined period thereafter, said means also responsive to a subsequent withdrawal of current occurring prior to the termination of the predetermined period to prolong the charging period following the cessation of current withdrawal for a time dependent upon the time at which such withdrawal commences.

10. The combination, with a battery and generator adapted to operate in parallel, means for automatically starting the operation of said generator when current is required, an automatic step-by-step switch, means for periodically advancing said switch as soon as the need for current ceases, means operated by said switch when it has advanced a predetermined amount for stopping the operation of said generator, and means for stopping the advance of said switch if current is again required during the period.

11. The combination, with a battery and generator adapted to operate in parallel, means for automatically starting the operation of said generator when current is required, an automatic step-by-step switch, means for periodically advancing said switch as soon as the need for current ceases, means operated by said switch when it has advanced a predetermined amount for stopping the operation of said generator, and means for stopping the advance of said switch if current is again required during the period, and for causing the advance of said switch to be resumed responsive to the cessation of current withdrawal.

In witness whereof, I hereunto subscribe my name this 16th day of August, A. D. 1924.

CLARENCE E. LOMAX.